(12) United States Patent
Kim et al.

(10) Patent No.: US 10,799,854 B2
(45) Date of Patent: Oct. 13, 2020

(54) CU/LTA CATALYST AND EXHAUST SYSTEM, AND MANUFACTURING METHOD OF CU/LTA CATALYST

(71) Applicant: Hyundai Motor Company, Seoul (KR)

(72) Inventors: Pyung Soon Kim, Suwon-si (KR); Chang Hwan Kim, Seongnam-si (KR); ChangHo Jung, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/591,460

(22) Filed: May 10, 2017

(65) Prior Publication Data
US 2018/0133702 A1 May 17, 2018

(30) Foreign Application Priority Data
Nov. 16, 2016 (KR) .................... 10-2016-0152864

(51) Int. Cl.
*B01J 35/00* (2006.01)
*B01J 37/02* (2006.01)
(Continued)

(52) U.S. Cl.
CPC .......... *B01J 29/80* (2013.01); *B01D 53/9413* (2013.01); *B01D 53/9418* (2013.01); *B01J 29/76* (2013.01); *B01J 29/763* (2013.01); *B01J 29/7607* (2013.01); *B01J 35/0006* (2013.01); *B01J 35/04* (2013.01); *B01J 37/0246* (2013.01); *B01J 37/08* (2013.01); *B01J 37/30* (2013.01); *C01B 39/145* (2013.01); *F01N 3/035* (2013.01); *F01N 3/2066* (2013.01); *B01D 2255/2092* (2013.01);
(Continued)

(58) Field of Classification Search
None
See application file for complete search history.

(56) References Cited

U.S. PATENT DOCUMENTS

| 3,314,752 A | 4/1967 | Kerr et al. |
| 4,292,205 A * | 9/1981 | Bowes ................... B01J 29/40 |
| | | 423/DIG. 16 |

(Continued)

FOREIGN PATENT DOCUMENTS

| CN | 104907092 A | 9/2015 |
| CN | 105247178 A | 1/2016 |

(Continued)

OTHER PUBLICATIONS

Badran "Studies on the surface area of Fe(III) and Cu(II) ion exchanged zeolites of Type A and X using sorption and X-Ray Powder diffraction". Inorganica Chimica Acta, 233-238, 21 (1977) (Year: 1977).*

(Continued)

*Primary Examiner* — Sheng H Davis
(74) *Attorney, Agent, or Firm* — Morgan, Lewis & Bockius LLP

(57) ABSTRACT

Provided herein is an exhaust system comprising a diesel particulate filter coated with a selective catalytic reduction (SDPF) wherein the SCR is coated with a Cu/LTA catalyst comprising a LTA zeolite that includes copper ions and the SCR is coated on a high pore diesel particulate matter filter, wherein a ratio of copper and aluminum is from about 0.14 to about 0.48, and wherein the Si/Al ratio of the LTA zeolite is from about 8 to about 100.

4 Claims, 10 Drawing Sheets

300

(51) Int. Cl.
*B01D 53/94* (2006.01)
*B01J 29/80* (2006.01)
*B01J 29/76* (2006.01)
*B01J 35/04* (2006.01)
*C01B 39/14* (2006.01)
*B01J 37/08* (2006.01)
*B01J 37/30* (2006.01)
*F01N 3/035* (2006.01)
*F01N 3/20* (2006.01)

(52) U.S. Cl.
CPC ............ *B01D 2255/20761* (2013.01); *B01D 2255/30* (2013.01); *B01D 2255/50* (2013.01); *B01D 2255/9032* (2013.01); *B01D 2255/915* (2013.01); *B01D 2255/9155* (2013.01); *B01D 2258/012* (2013.01); *B01J 2229/183* (2013.01); *B01J 2229/186* (2013.01); *B01J 2229/36* (2013.01); *F01N 2370/04* (2013.01)

(56) References Cited

U.S. PATENT DOCUMENTS

| | | | |
|---|---|---|---|
| 8,329,127 B2* | 12/2012 | Cox | B01D 53/9468 423/213.2 |
| 9,757,718 B2* | 9/2017 | Fedeyko | B01J 29/763 |
| 2005/0137079 A1* | 6/2005 | LaBarge | B01D 53/945 502/150 |
| 2008/0060348 A1* | 3/2008 | Robel | F01N 13/009 60/295 |
| 2012/0020875 A1* | 1/2012 | Matsuo | B01D 53/9418 423/700 |
| 2013/0089494 A1 | 4/2013 | Reichinger et al. | |
| 2014/0170045 A1* | 6/2014 | Fedeyko | B01J 29/74 423/237 |
| 2014/0241950 A1* | 8/2014 | Chandler | F01N 3/0222 422/171 |
| 2015/0098870 A1* | 4/2015 | Lambert | B01D 53/8628 422/168 |
| 2015/0258537 A1* | 9/2015 | Morohoshi | B01J 29/072 423/213.2 |
| 2016/0367941 A1* | 12/2016 | Gilbert | B01D 53/9468 |
| 2017/0087541 A1* | 3/2017 | Andersen | B01D 53/9472 |

FOREIGN PATENT DOCUMENTS

| | | | |
|---|---|---|---|
| EP | 2 123 354 A1 | | 11/2009 |
| EP | 2 965 813 A1 | | 1/2016 |
| EP | 3 311 916 A1 | | 4/2018 |
| JP | 410252454 | * | 9/1998 |
| JP | 2004168648 | * | 11/2002 |
| KR | 10-2013-0058994 A | | 6/2013 |
| WO | 2008106519 | * | 9/2008 |
| WO | WO 2012/037342 A1 | | 3/2012 |
| WO | WO 2013/159825 A1 | | 10/2013 |

OTHER PUBLICATIONS

Anderson "electron Spin Echo Study of Cu 2+ Doped Zeolite K-ZK4: Cation Location and Adsorbate Interaction". J. Phys. Chem. 3206-3212, 90 (1986) (Year: 1986).*

Donghui Jo, "synthesis of High-Silica LTA and UFI Zeolites . . . " ACS Catalysis. 2443-2446 ( 2016). (Year: 2016).*

Extended European Search Report for Application No. 17170798.7, dated Jul. 17, 2107, 8 pages.

Boal, B.W. et al., "Facile Synthesis and Catalyst of Pure-Silica and Heteroatom LTA," Chem. Mater., vol. 27, Nov. 5, 2015, p. 7774-7779.

Donghui Jo, et. al., "Synthesis of High-Silica LTA and UFI zeolites and $NH_3$-SCR Performance of Their Copper-Exchanged Form", ACS Catal. 2016. 6, 2443-2447.

Donghui Jo et al.; *Supporting Information "Synthesis of High-Silica LTA and UFI Zeolites and NH3-SCR Performance of their Copper-Exchanged Form,"* pp. S1-S27.

* cited by examiner

CU/LTA CATALYST AND EXHAUST SYSTEM, AND MANUFACTURING METHOD OF CU/LTA CATALYST

CROSS-REFERENCE TO RELATED APPLICATION

This application claims priority under 35 U.S.C. 119(a) the benefit of Korean Patent Application No. 10-2016-0152864 filed on Nov. 16, 2016, the entire contents of which are incorporated herein by reference.

BACKGROUND OF THE INVENTION

Field of the Invention

The present invention relates to a Cu/LTA catalyst (a catalyst comprising divalent copper ions fully exchanged into high silica LTA zeolites) and an exhaust system, and manufacturing method of Cu/LTA catalyst. More particularly, the present invention relates to a Cu/LTA catalyst and exhaust system, and manufacturing method of Cu/LTA catalyst which may reduce harmful material in the exhaust gas.

Description of the Related Art

In general, in exhaust gas of diesel vehicles, carbon monoxide, hydrocarbons, and nitrogen oxides are included as harmful materials. Nitrogen oxides cause environmental problems such as photochemical smog and acid rain, as well as human diseases. Therefore, there is a demand for improving engines and developing a post-treatment technology of exhaust gas.

The most effective technology for removing nitrogen oxides uses a selective catalytic reduction (SCR) method. This method has been developed according to a reducing agent such as ammonia ($NH_3$), urea, hydrocarbon (HC), and the like, and various catalysts. Ammonia ($NH_3$) has been known to be effective in removing nitrogen oxides from a fixed object such as a power plant and an incinerator. Since there is a problem of storage/transport and use of ammonia, in the case of a moving object such as a vehicle, urea has been known to be effective as it is capable of being easily decomposed to ammonia by heat decomposition and a hydration reaction.

Meanwhile, as the catalyst for use in the selective catalyst reduction method, zeolite-based catalysts such as copper (Cu)/zeolite having excellent functions has been developed. The zeolite-based catalysts have a drawback in that the structure can collapse during high temperature thermal treatment, therefore it is hard to apply to vehicles. However, a zeolite having CHA structure and strong thermal durability has been developed and applied to the vehicle SCR catalyst (Cu/SSZ-13).

Recently, a technology for high purification performance of nitrogen was developed by coating SCR catalyst on DPF (Diesel Particulate Matter Filter). To apply the SCR catalyst on the DPF (SDPF), a catalyst having higher thermal durability and purification performance of nitrogen than Cu/SSZ-13 is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a Cu/LTA catalyst that can maintain activity and stability in a high temperature and an exhaust system, and a manufacturing method of said Cu/LTA catalyst.

An exhaust system according to an exemplary embodiment of the present invention includes a diesel particular filter coated with a selective catalytic reduction or an SDPF. The SDPF includes a selective catalytic reduction (SCR) that is coated with a Cu/LTA catalyst including a LTA zeolite that includes copper ions is coated. The SCR is coated on a high pore diesel particulate matter filter, wherein a ratio of copper and aluminum is from about 0.14 to about 0.48, and the Si/Al ratio of the LTA zeolite is from about 8 to about 100.

The ratio of copper and aluminum may be from about 0.32 to about 0.48.

A content of copper with respect to the total weight of the Cu/LTA catalyst may be from about 0.5 wt % to about 5 wt %.

A content of copper with respect to the total weight of the Cu/LTA catalyst may be from about 1.5 wt % to about 3 wt %.

The ratio of Si/Al of the LTA zeolite may be from about 11 to about 16.

An exhaust system according to an exemplary embodiment of the present invention includes a selective catalytic reduction (SCR) device on which a Cu/LTA catalyst including a LTA zeolite that includes copper ions is coated, wherein a ratio of copper and aluminum is from about 0.14 to about 0.48, and the Si/Al ratio of the LTA zeolite is from about 8 to about 100.

An exhaust system according to another exemplary embodiment of the present invention includes an SDPF that the Cu/LTA catalyst is coated on one side surface and the Cu/CHA catalyst is coated on the other side surface. In other words, in some embodiments, the SDPF is coated with the Cu/LTA catalyst on one side surface and coated with the Cu/CHA catalyst on the other side surface.

The Cu/LTA catalyst may be coated on the surface of the SDPF with range of about 40% to about 60% of entire length of the SDPF.

An exhaust system according to another exemplary embodiment of the present invention includes a composite catalyst unit SCR on which Cu/CHA catalyst is coated is further included at a rear end of the SDPF. In other words, the rear end of the SDPF is coated with the Cu/CHA catalyst.

In some aspects, a manufacturing method of Cu/LTA catalyst according to an exemplary embodiment of the present invention includes preparing a LTA zeolite of which a ratio of Si/Al is from about 8 to about 100; manufacturing a LTA zeolite that includes ions using the LTA zeolite; and manufacturing a Cu type of LTA zeolite by performing copper ion exchange on the LTA zeolite including ions, wherein a ratio of copper and aluminum in the Cu type of LTA zeolite is from about 0.14 to about 0.48.

A ratio of Si/Al of the prepared LTA zeolite may be from about 11 to about 16.

A content of copper with respect to the total weight of the catalyst may be from about 0.5 wt % to about 5 wt %.

The manufacturing of the LTA zeolite that includes ions may be performed by substituting ions to the LTA zeolite.

The manufacturing of the LTA zeolite that includes ions includes injecting the LTA zeolite into an ammonium salt solution to react them and then performing drying, and the ammonium salt may be ammonium nitrate ($NH_4NO_3$).

A manufacturing method of Cu/LTA catalyst according to an exemplary embodiment of the present invention may further include thermally treating the Cu type of LTA zeolite after the manufacturing of the Cu type of LTA zeolite.

The thermal treatment may be performed while increasing a temperate to about 400 to about 750° C. at a speed of from about 1 to about 30° C./min.

The heat treatment may be performed for from about 1 to about 24 hours.

According to an exemplary embodiment of the present invention, deterioration may be prevented and purification performance of the nitrogen oxide may be improved by applying Cu/LTA catalyst having improved heat resistance.

Also, hydrothermal stability of the Cu/LTA catalyst is excellent to be applied to SCR or SDPF.

Also, regeneration period may be increased by improved heat resistance, and fuel consumption efficiency can be improved since the amount of soot loading may be increased.

Also, temperature of the SDPF may be increased by improving heat resistance to improve efficiency of eliminating the soot.

DESCRIPTION OF SYMBOLS

Figure 1:
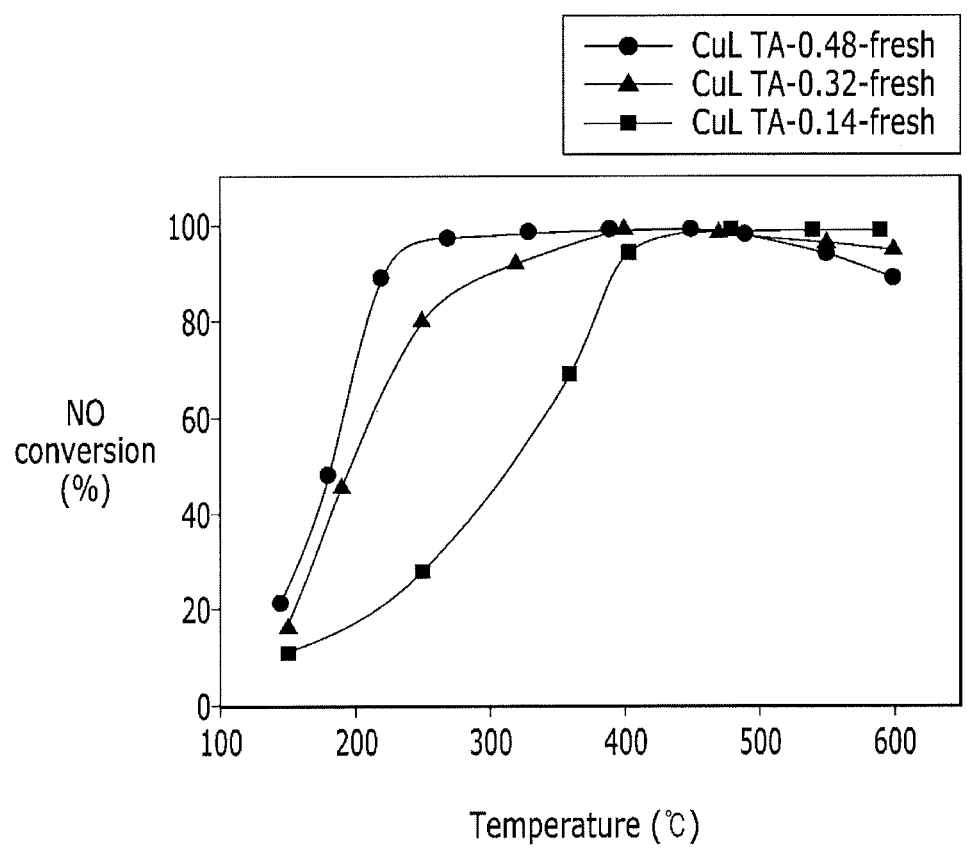
FIG. 1 is a graph illustrating NOx purification performance of a Cu type of LTA zeolite according to a ratio of copper and a ratio of aluminum.

100: SCR
200, 300: SDPF
400: composite catalyst unit

DETAILED DESCRIPTION OF THE EMBODIMENTS

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, same structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present invention shows an exemplary embodiment of the present invention in detail. As a result, various modifications of the drawings will be expected. Therefore, the exemplary embodiment is not limited to a specific aspect of the illustrated region, and for example, includes modifications of an aspect by manufacturing.

A Cu/LTA catalyst according to an exemplary embodiment of the present invention includes a LTA zeolite that includes copper ions, and a ratio of copper and aluminum is from about 0.14 to about 0.48 (e.g., about 0.14, 0.16, 0.18, 0.20, 0.22, 0.24, 0.26, 0.28, 0.30, 0.32, 0.34, 0.36, 0.38, 0.40, 0.42, 0.44, 0.46, or about 0.48), and the Si/Al ratio of the LTA zeolite is from about 8 to about 100 (e.g., about 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, or about 100). Further, more preferably, the ratio of copper and aluminum may be from about 0.32 to about 0.48 (e.g., about 0.32, 0.33, 0.34, 0.35, 0.36, 0.37, 0.38, 0.39, 0.40, 0.41, 0.42, 0.43, 0.44, 0.45, 0.46, 0.47, or about 0.48).

However, this is not restrictive, and a ratio of copper and aluminum may be adjusted depending on an environment where the catalyst is used according to another exemplary embodiment.

In addition, when a content of copper is indicated using wt % with respect to the total weight of the catalyst, a content of copper with respect to the total weight of catalyst may be from about 0.5 wt % to about 5 wt % (e.g., about 0.5 wt %, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or about 5.0 wt %). Further, more preferably, the content of copper may be from about 1.5 wt % to about 3 wt % (e.g., about 1.5 wt %, 1.6, 1.7, 1.8, 1.9, 2.0, 2.1, 2.2, 2.3, 2.4, 2.5, 2.6, 2.7, 2.8, 2.9, or about 3 wt %).

Further, more preferably, the Si/Al ratio of the LTA zeolite may be from about 11 to about 16 (e.g., about 11, 12, 13, 14, 15, or about 16).

Now, a performance of the Cu/LTA catalyst according to an exemplary embodiment of the present invention will be described with reference to FIG. 1 to FIG. 4.

Figure 2:
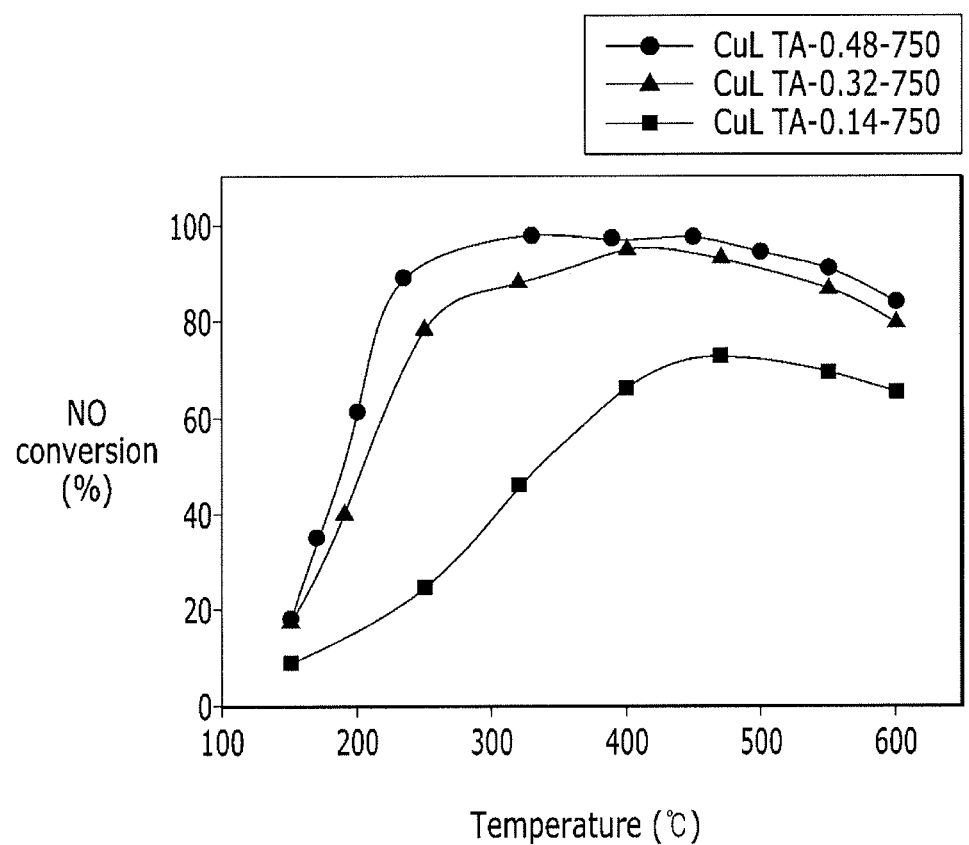
FIG. 2 illustrates NOx purification performance of Cu type of LTA zeolites, each having a different ratio of copper and aluminum, after hydrothermal aging is performed at 750° C. for about 24 h.
Figure 3:
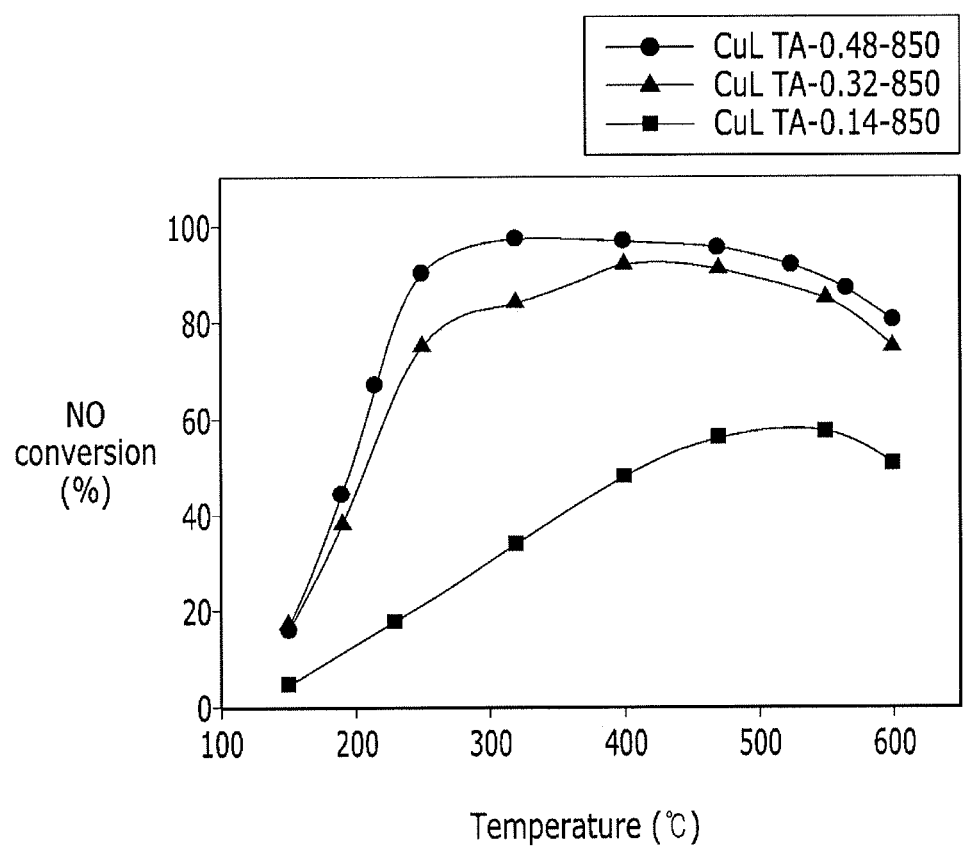
FIG. 3 illustrates NOx purification performance of Cu type of LTA zeolites, each having a different ratio of copper and aluminum, after hydrothermal aging is performed at 850° C. for about 24 h.
Figure 4:
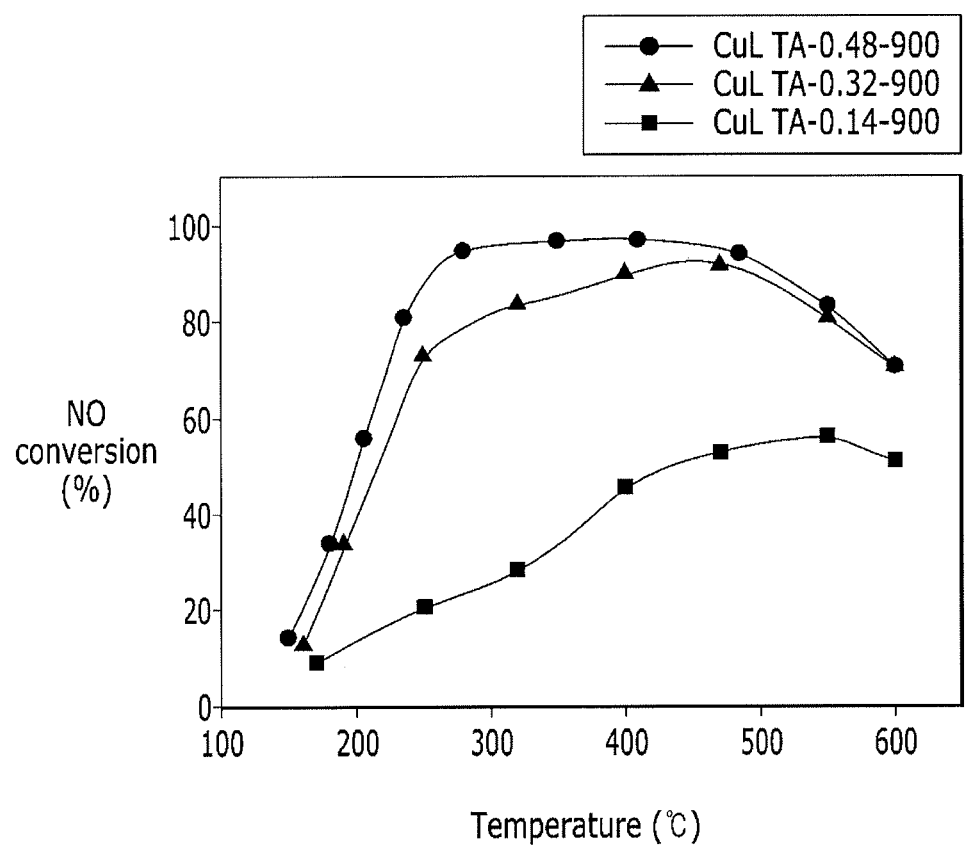
FIG. 4 illustrates NOx purification performance of Cu type of LTA zeolites, each having a different ratio of copper and aluminum, after hydrothermal aging is performed at 900° C. for about 24 h.

FIG. 1 is a graph illustrating NOx purification performance of a Cu type of LTA zeolite according to a ratio of copper and a ratio of aluminum, FIG. 2 illustrates NOx purification performance of Cu type of LTA zeolites, each having a different ratio of copper and aluminum, after hydrothermal aging is performed at 750° C. for about 24 h, FIG. 3 illustrates NOx purification performance of Cu type of LTA zeolites, each having a different ratio of copper and aluminum, after hydrothermal aging is performed at 850° C. for about 24 h, and FIG. 4 illustrates NOx purification performance of Cu type of LTA zeolites, each having a different ratio of copper and aluminum, after hydrothermal aging is performed at 900° C. for about 24 h.

Referring to FIG. 1, it was observed than when a ratio of copper and aluminum was between 0.14 and 0.48, NOx purification performance was excellent at a temperature over 400° C. In addition, it was observed than when a ratio of copper and aluminum was between 0.32 and 0.48, NOx purification performance was excellent at a temperature over 200° C. In this case, a ratio of Si/Al is 16, and a content of copper with respect to the total weight of the Cu/LTA catalyst is 0.14 wt % when the ratio of copper and aluminum is 0.14, a content of copper with respect to the total weight of the Cu/LTA catalyst is 1.95 wt % when the ratio of copper and aluminum is 0.324, and a content of copper with respect to the total weight of the Cu/LTA catalyst is 2.71 wt % when the ratio of copper and aluminum is 0.48.

FIG. 2 shows NOx purification performance of Cu type of LTA zeolite catalysts, each having a different ratio of copper and aluminum, after performing hydrothermal aging at 750° C. for about 24 h. Referring to FIG. 2, it was observed that when a ratio of copper and aluminum is 0.32 to 0.48, more than 70% of NOx purification efficiency was shown within a reaction temperature range of 250° C. to 600° C. In this case, the hydrothermal aging was performed by adding 10 wt % of water, and the Si/Al ratio of the zeolite and the content of copper with respect to the total weight of the Cu/LTA catalyst are same with them of experiment examples of FIG. 1.

FIG. 3 shows NOx purification performance of Cu type of LTA zeolite catalysts, each having a different ratio of copper and aluminum, after performing hydrothermal aging at 850° C. for about 24 h. Referring to FIG. 3, it was observed that when a ratio of copper and aluminum is 0.32 to 0.48, more than 70% of NOx purification efficiency was shown within a reaction temperature range of 250° C. to 600° C. In this case, the hydrothermal aging, the Si/Al ratio of the zeolite and the content of copper with respect to the total weight of the Cu/LTA catalyst are same with them of experiment examples of FIG. 2.

FIG. 4 shows NOx purification performance of Cu type of LTA zeolite catalysts, each having a different ratio of copper and aluminum, after performing hydrothermal aging at 900° C. for about 24 h. Referring to FIG. 4, it was observed that when a ratio of copper and aluminum is 0.32 to 0.48, more than 70% of NOx purification efficiency was shown within a reaction temperature range of 250° C. to 600° C. In this case, the hydrothermal aging, the Si/Al ratio of the zeolite and the content of copper with respect to the total weight of the Cu/LTA catalyst are same with them of experiment examples of FIG. 2.

Referring to FIG. 1 to FIG. 4, in case a ratio of copper and aluminum is 0.32 to 0.48 and a content of copper with respect to the total weight of the Cu/LTA catalyst is 1.5 wt % to 3 wt %, it was observed that more than 70% of NOx purification efficiency was shown within a high reaction temperature range of 250° C. to 600° C. after hydrothermal aging.

Figure 5:
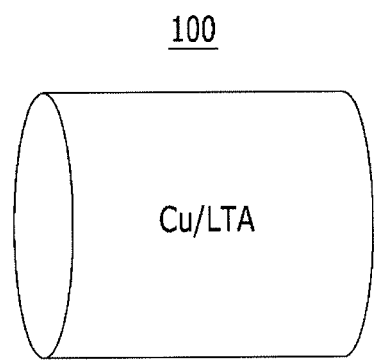
FIG. 5 is a drawing of SCR catalyst according to an exemplary embodiment of the present invention.
Figure 6:
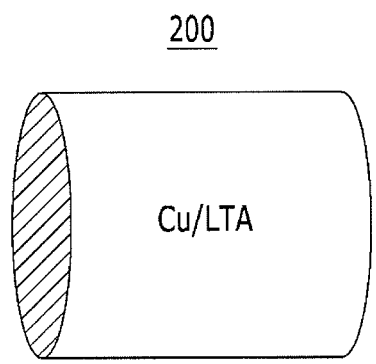
FIG. 6 is a drawing of SDPF according to an exemplary embodiment of the present invention.
Figure 7:
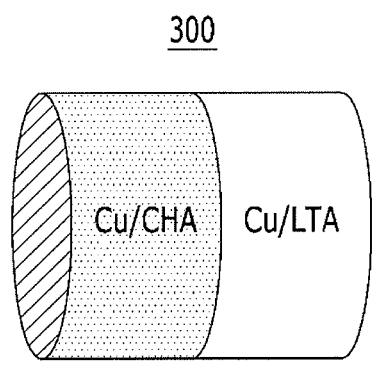
FIG. 7 is a drawing of SDPF according to another exemplary embodiment of the present invention.
Figure 8:
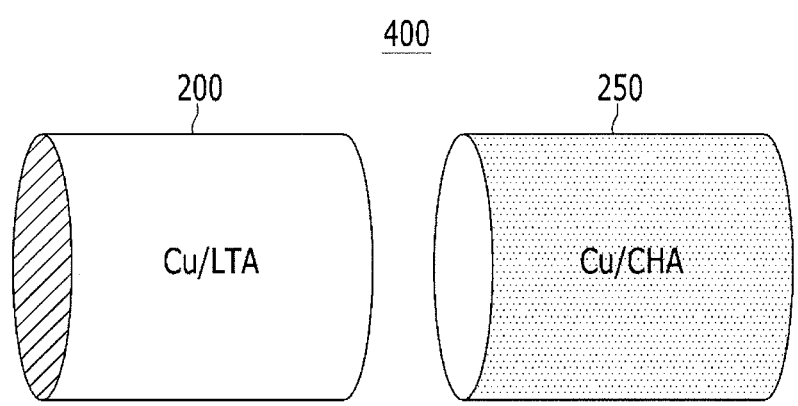
FIG. 8 is a drawing of composite catalyst unit according to an exemplary embodiment of the present invention.

FIG. 5 is a drawing of SCR catalyst according to an exemplary embodiment of the present invention, FIG. 6 is a drawing of SDPF according to an exemplary embodiment of the present invention, FIG. 7 is a drawing of SDPF according to another exemplary embodiment of the present invention, and FIG. 8 is a drawing of composite catalyst unit according to an exemplary embodiment of the present invention.

Referring to FIG. 5, an exhaust system according to an exemplary embodiment of the present invention may include a selective catalytic reduction (SCR) 100 device on which the Cu/LTA catalyst as described above is coated Also, as shown in FIG. 6, the exhaust system may include an SDPF 200 that SCR on which the Cu/LTA catalyst as described above is coated is coated on a high pore diesel particulate matter filter.

Also, as shown in FIG. 7, the exhaust system exhaust system may include an SDPF 300 that the Cu/LTA catalyst is coated on one side surface and the Cu/CHA catalyst is coated on the other side surface. The Cu/CHA catalyst may be coated on the front end that has low temperature during regeneration of DPF, and the Cu/LTA catalyst may be coated on the rear end that has high temperature. Also, the Cu/LTA catalyst may be coated on the surface of the SDPF with range of from about 40% to about 60% (e.g., about 40%, 41, 42, 43, 44, 45, 46, 47, 48, 49, 50, 51, 52, 53, 54, 55, 56, 57, 58, 59, or about 60%) of entire length of the SDPF.

The Cu/CHA catalyst may include SSZ-13 zeolite including copper ions, and the SSZ-13 zeolite is an aluminosilicate zeolite having micro pores of 0.38×0.38 nm and expressed as $Q_xNa_yAl_{2.4}Si_{33.6}O_{72}zH_2O$, and x is 1.4 to 27, y is 0.7 to 4.3, and z is 1 to 7. The Q may be N,N,N-1-trimethylada-mantammonium. The copper type SSZ-13 zeolite has a high catalytic performance in a low temperature. Accordingly, when the copper type LTA zeolite and the copper type SSZ-13 zeolite are used by mixing, excellent catalytic performance can be maintained in a low temperature to a high temperature.

Further, as shown in FIG. 8, an exhaust system according to another exemplary embodiment of the present invention may include a composite catalyst unit 400 SCR 250 on which Cu/CHA catalyst is coated is further included at a rear end of the SDPF 200.

The SDPF 200 may be an SDPF that SCR on which the Cu/LTA catalyst as illustrated in FIG. 6 is coated is coated on a high pore diesel particulate matter filter.

Figure 9:
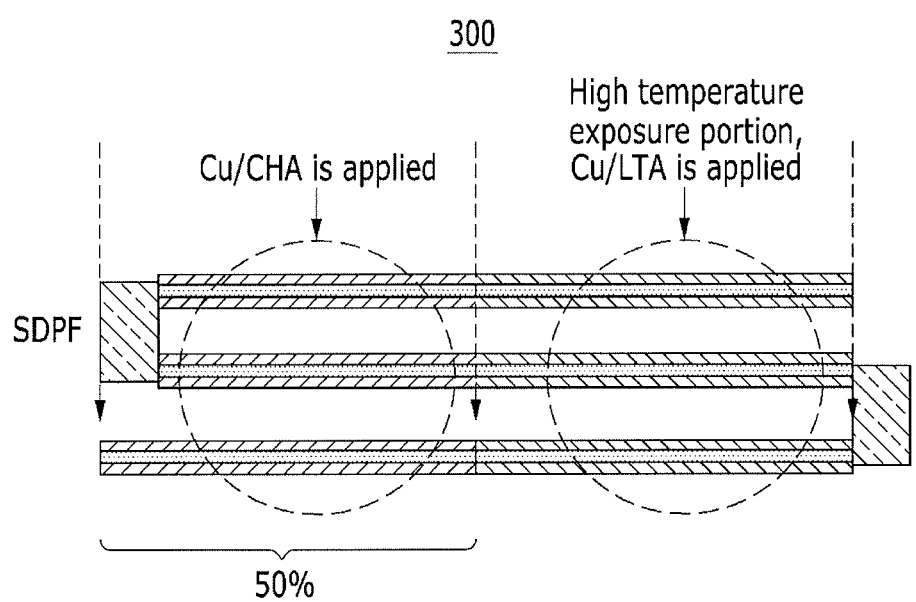
FIG. 9 is a drawing of inner structure of the SDPF illustrated in FIG. 7.

FIG. 9 is a drawing of inner structure of the SDPF illustrated in FIG. 7. As shown in FIG. 9, the Cu/LTA catalyst may be coated on one side front end of the SDPF 300 and the Cu/CHA catalyst may be coated on the other side rear end. In this case, the Cu/LTA catalyst may be coated on the surface of the SDPF 300 with range of 40% to 60% of entire length of the SDPF, especially, may be coated with range of 50%.

Figure 10:
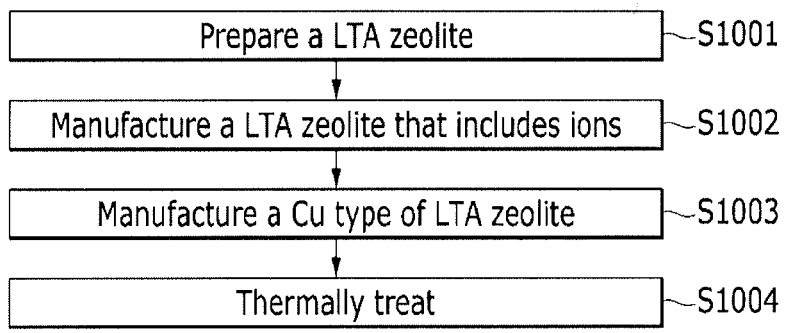
FIG. 10 is a flowchart illustrating a manufacturing method of Cu/LTA catalyst according to an exemplary embodiment of the present invention.

FIG. 10 is a flowchart illustrating a manufacturing method of Cu/LTA catalyst according to an exemplary embodiment of the present invention.

Referring to FIG. 10, firstly, a manufacturing method of Cu/LTA catalyst includes preparing a LTA zeolite of which a ratio of Si/Al is 8 to 100 S1001. The LTA zeolite may be prepared by using a seed or without using a seed. Preferably, a ratio of Si/Al may be from about 11 to about 16 (e.g., about 11, 12, 13, 14, 15 or about 16).

In order to prepare the LTA zeolite, an LTA seed may be mixed in a mixture of aluminum hydroxide ($Al(OH)_3$) and tetraethyl orthosilicate ($Si(OC_2H_5)_4$).

Specifically, a 1,2-dimethyl-3-(4-methylbenzyl)imidazolium hydroxide aqueous solution and aluminum hydroxide ($Al(OH)_3$) are mixed and the mixture is primarily stirred, and then tetramethylammonium hydroxide pentahydrate is additionally mixed and then secondarily stirred so as to prepare a first mixture.

Here, with respect to the total weight of the first mixture, 20~35 wt % (e.g., from about 20 wt % to about 35 wt %, about 20 wt %, 21, 22, 23, 24, 25, 26, 27, 28, 29, 30, 31, 32, 33, 34, or about 35 wt %) of 1,2-dimethyl-3-(4-methylbenzyl)imidazolium hydroxide, 1~2 wt % (e.g., from about 1 wt % to about 2 wt %, about 1 wt %, 1.1, 1.2, 1.3, 1.4, 1.5, 1.6, 1.7, 1.8, 1.9, or about 2 wt %) of aluminum hydroxide (Al(OH)$_3$), 1~5 wt % (e.g., from about 1 wt % to about 5 wt %, about 1 wt %, 2, 3, 4, or about 5 wt %), of tetramethylammonium hydroxide pentahydrate, and a residual quantity of water are mixed, and the primary stirring and the secondary stirring may be respectively performed for about 0.5 to 1.5 h (e.g., about 0.5 h, 0.6, 0.7, 0.8, 0.9, 1.0, 1.1, 1.2, 1.3, 1.4, or about 1.5 h).

Tetraethyl orthosilicate (TEOS) (Si(OC$_2$H$_5$)$_4$) is mixed into the first mixture and then third stirring is performed, and then the LTA seed is mixed and fourth stirring is performed so as to prepare a second mixture.

30~35 wt % (e.g., from about 30 wt % to about 35 wt %, about 30 wt %, 31, 32, 33, 34, or about 35 wt %) of TEOS may be mixed with respect to the total weight of the second mixture, and the amount of LTA seed may be 2~6 wt % (e.g., from about 2 wt % to about 6 wt %, about 2 wt %, 3, 4, 5, or about 6 wt %) with respect to the total weight of the entire silicon included in LTA zeolite.

In addition, the third stirring may be performed for about 2 to 4 h (e.g., about 2, 2.5, 3, 3.4, or about 4 h), and the fourth stirring may be performed for about 20 to 28 h (e.g., about 20, 21, 22, 23, 24, 25, 26, 27, or about 28 h).

Next, the second mixture is sufficiently heated to cause hydrolysis of the TEOS, and ethanol and water generated from the hydrolysis of TEOS are evaporated such that a third mixture is prepared.

The second mixture may be heated at a temperature between from about 70° C. and about 90° C. (e.g., about 70° C., 71, 72, 73, 74, 75, 76, 77, 78, 79, 80, 81, 82, 83, 84, 85, 86, 87, 88, 89, or about 90° C.).

Next, a hydrofluoric aqueous solution is mixed in the third mixture, and a fourth mixture is prepared through heating, cleansing, and drying processes.

Here, the third mixture may be heated for a constant time period at a temperature of from about 150° C. to about 200° C. (e.g., about 150° C., 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, or about 200° C.), the cleansing process may be iteratively performed, and the drying process may be performed at room temperature.

Next, heat treatment is additionally performed to remove an organic material from the fourth mixture such that the LTA zeolite for manufacturing the zeolite catalyst according to the exemplary embodiment of the present invention is manufactured.

When the LTA zeolite is manufactured without using a seed, the following method may be used. In a plastic beaker, 0.1 to 1.0 mole of aluminium hydroxide and 0.0 to 0.2 mole of tetramethylammonium hydroxide (hereinafter, referred to as TMAOH) are added to 0.1 to 0.2 mole of 2-Dimethyl-3-(4-methylbenzyl) imidazolium hydroxide (hereinafter, referred to as 12DM3 (4MB) IOH), which is an organic structure directing agent, and then sufficiently stirred. Next, with respect to the content of the reactant, tetraethyl orthosilicate (hereinafter, referred to as TEOS) is mixed to be a ratio of 1 mole and then sufficiently stirred.

Next, the solution is sufficiently heated at 60 to 100° C. to completely remove ethanol generated from the hydrolysis of TEOS and at the same time to make the amount of water generated from the hydrolysis of TEOS become 0 to 10 mole. Then, 0.1 to 1.0 mole of hydrogen fluoride (HF) is added and then sufficiently stirred such that a reaction mixture having a composition of Chemical Formula 1 is acquired.

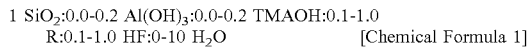

1 SiO$_2$:0.0-0.2 Al(OH)$_3$:0.0-0.2 TMAOH:0.1-1.0 R:0.1-1.0 HF:0-10 H$_2$O  [Chemical Formula 1]

wherein R is 12DM3 (4MB)IOH.

The reaction mixture is moved to a teflon reactor and received in a container that is made of stainless steel, and then heated at 100 to 200° C. for 0.1 to 14 days such that a LTA zeolite can be manufactured. A ratio of Si/Al of the LTA zeolite manufactured through above-stated method may also be 5 to 50. However, the method for manufacturing the LTA zeolite is not limited to the above-stated method.

Next, a LTA zeolite that includes ions is manufactured using the LTA zeolite S1002.

First, the LTA zeolite is put into ammonium salt and refluxed, and then cleansing and drying processes are performed to prepare an LTA zeolite including NH$_4^+$ ions (i.e., NH$_4$ type of LTA zeolite). Here, the ammonium salt may be ammonium nitrate (NH$_4$NO$_3$). The reflux process may be performed at a temperature between 60° C. and 100° C. for about 5 to 7 h. In the present exemplary embodiment, ions are exemplarily described as ammonium ions, but this is not restrictive. That is, use of other ions and ion salt is also included in the scope of the present invention.

Next, a Cu type of LTA zeolite is manufactured by performing copper ion exchange on the LTA zeolite including ions S1003. In the Cu type of LTA zeolite manufactured in the present step, a ratio of copper and aluminum may be from about 0.14 to about 0.48 (e.g., about 0.14, 0.16, 0.18, 0.20, 0.22, 0.24, 0.26, 0.28, 0.30, 0.32, 0.34, 0.36, 0.38, 0.40, 0.42, 0.44, 0.46, or about 0.48). However, the ratio is not limited thereto, and can be appropriately adjusted according to an environmental condition where the catalyst is used.

In addition, when a content of copper is indicated by using wt %, a content of copper may be from about 0.5 wt % to about 5 wt % (e.g., about 0.5 wt %, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or about 5.0 wt %). More preferably, the content of copper may be 1.5 wt % to 3 wt % (e.g., about 1.5 wt %, 1.6, 1.7, 1.8, 1.9, 2.0, 2.1, 2.2, 2.3, 2.4, 2.5, 2.6, 2.7, 2.8, 2.9, or about 3 wt %).

In a previous step, a dried NH$_4$ type of LTA zeolite including NH$_4^+$ ions undergoes copper (Cu) ion exchange such that a Cu type of LTA zeolite including copper ions may be prepared.

For the copper ion exchange, the dried NH$_4$ type of LTA zeolite including NH$_4^+$ ions is injected into a copper precursor solution such as copper acetate monohydrate, copper nitride, copper nitrate, copper sulfate, and the like, and stirred, and then cleansing and drying processes are performed such that the Cu type of LTA zeolite can be prepared.

Next, the Cu type of LTA zeolite is heated in an oven with a gradually increasing temperature, and then a heat treatment process is performed such that the catalyst according to the exemplary embodiment of the present invention is manufactured S1004.

Here, for the heat temperature of the Cu type of LTA zeolite, the temperature may be increased to about 400 to about 750° C. (e.g., about 400° C., 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, or about 750° C.) at a rate of about 1 to about 30° C./min (e.g., about 1° C./min, 2, 3, 4, 5, 6, 7, 8, 9, 10, 11, 12, 13, 14, 15, 16, 17, 18, 19, 20, 21, 22, 23, 24, 25, 26, 27, 28, 29, or about 30° C./min), and then the heat treatment may be performed to about 1 to about 24 h (e.g., about 1, 2, 3, 4, 5, 6, 7, 8, 9, 10, 11, 12, 13, 14, 15, 16, 17, 18, 19, 20, 21, 22, 23, or about 24 h).

In the Cu type of LTA zeolite manufactured in the present step, a ratio of copper and aluminum may be from about 0.14 to about 0.48 (e.g., about 0.14, 0.16, 0.18, 0.20, 0.22, 0.24, 0.26, 0.28, 0.30, 0.32, 0.34, 0.36, 0.38, 0.40, 0.42, 0.44, 0.46, or about 0.48). More preferably, the ratio may be from about 0.32 to about 0.48 (e.g., about 0.32, 0.33, 0.34, 0.35, 0.36, 0.37, 0.38, 0.39, 0.40, 0.41, 0.42, 0.43, 0.44, 0.45, 0.46, 0.47, or about 0.48).

Such a ratio of copper and aluminum is a ratio for excellent NOx purification performance while maintaining thermal stability.

Like this, according to an exemplary embodiment of the present invention, deterioration may be prevented and purification performance of the nitrogen oxide may be improved by applying Cu/LTA catalyst having improved heat resistance.

Also, hydrothermal stability of the Cu/LTA catalyst is excellent to be applied to SCR or SDPF.

Also, regeneration period may be increased by improved heat resistance, and fuel consumption efficiency can be improved since the amount of soot loading may be increased.

Also, temperature of the SDPF may be increased by improving heat resistance to improve efficiency of eliminating the soot.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An exhaust system comprising a diesel particulate filter coated with a selective catalytic reduction (SCR) (SDPF), wherein said SCR is coated with a Cu/LTA catalyst consisting essentially of a LTA zeolite and copper ions included in the LTA zeolite and said SCR is coated on a high pore diesel particulate matter filter,
   wherein a ratio of copper and aluminum in the Cu type of LTA zeolite is from about 0.14 to about 0.48,
   wherein the Si/Al ratio of the LTA zeolite is from about 11 to about 16,
   wherein the Cu/LTA catalyst with high temperature catalytic performance is coated on the rear end of the SPDF, and a Cu/CHA catalyst with low temperature catalytic performance is coated on the front end of the SPDF, and
   wherein a content of copper with respect to the total weight of the Cu/LTA catalyst is from about 1.5 wt % to about 3 wt %.

2. The exhaust system of claim 1, wherein:
   the ratio of copper and aluminum is from about 0.32 to about 0.48.

3. The exhaust system of claim 1, wherein:
   the Cu/LTA catalyst is coated on the surface of the SDPF with range of 40% to 60% of entire length of the SDPF.

4. The exhaust system of claim 1, further comprising:
   a composite catalyst unit SCR on which the Cu/CHA catalyst is coated and is at a rear end of the SDPF.

\* \* \* \* \*